J. P. B. FISKE

March 3, 1931. COOLING UNIT Re. 17,989

Original Filed Feb. 28, 1921

Witness:
G. L. Perry

Inventor
Packer B. Fiske
By his Attorneys
Blackmore, Spencer & Flint

Reissued Mar. 3, 1931 Re. 17,989

UNITED STATES PATENT OFFICE

JONATHAN P. B. FISKE, OF NEWTON, MASSACHUSETTS, ASSIGNOR, BY MESNE ASSIGNMENTS, TO KELVINATOR CORPORATION, OF DETROIT, MICHIGAN, A CORPORATION OF MICHIGAN

COOLING UNIT

Original No. 1,632,283, dated June 14, 1927, Serial No. 448,549, filed February 28, 1921. Application for reissue filed January 26, 1928. Serial No. 249,755.

This invention relates to mechanical devices for lowering the temperature of spaces within which the devices may be placed.

An object of the invention is the production of a cooling unit that may be placed in, and removed from, a cooling space as a unitary structure.

Another object of the invention is the production of a mechanical cooling device as a single unit and of such size and shape that it may be placed in position in the ice chest of the ordinary household refrigerator as at present constructed.

Another object of the invention is the provision of a mechanical cooling device in the form of a self-contained unit adapted, when installed in a space to be cooled, to set up a circulation of air over the cool surfaces of the unit that is effective and efficient regardless of the form and size of the space in which the unit is installed.

With these and other objects in view which will appear as the description proceeds, the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

It is common in the art to combine the compressor and condenser, and in some types of refrigerating machines, the motor also in a unitary structure distinct and separate from the evaporator or vaporizer element. The passages connecting the condenser and evaporator or vaporizer element of such structures are more or less complicated and extended depending on the location of the evaporator or vaporizer element relative to the compressor, thus rendering the problem of installation a more or less complicated one, which greatly increases the cost of the same and also multiplies the danger of leakage in the refrigerant system thus extended.

In all such constructions, the installation of the mechanism either necessitates modifications in the cabinet or other structure with which the device is associated or the device is so constructed and arranged that when assembled it becomes such a part of the associated structure that when the refrigerant mechanism requires inspection, adjustment or repairs, it is necessary that this work be done at the place where the refrigerating structure is located.

All refrigerating apparatus requires more or less attention technically called "service". Service on certain parts of the apparatus, such as motor, switch, water valve, etc., can be rendered with the apparatus in place by any intelligent mechanic without undue expense or inconvenience.

When it becomes necessary, however, to inspect or repair any of the mechanism enclosed within the refrigerant circuit, as for instance the compressor, valve, expansion valve etc., it becomes necessary to discharge the refrigerant and to open up the machine. This is a highly technical matter involving experience and skill on the part of the service man and usually a very considerable equipment of special apparatus and tools. It is, therefore, necessary to send to the owner's home a man of this character at a large expense to discharge and dismantle the machine, make the necessary inspection and repairs, reassemble it and recharge it with refrigerant.

This process is attended with many disadvantages as the refrigerator is usually in the kitchen or pantry and is in constant use by the household. There is usually insufficient room for doing a considerable amount of work of this character and the interference of the household routine is serious. Furthermore, the escape into the kitchen of any refrigerating gas is a very serious matter and often makes it necessary to suspend all kitchen activities while the process is going on.

The necessity of sending highly trained experts with special apparatus to the customer's home is attended with such great expense that heretofore it has been found necessary to restrict the installation of household refrigerators to points reasonably adjacent to service headquarters. This has been found one of the most serious handicaps to the extension of the business.

In order to overcome these difficulties, I have devised the so-called "unit construction" with the compressor, condenser and the evaporator constructed and arranged in one unit so that the entire apparatus may be placed within the space to be refrigerated.

When anything goes wrong with the apparatus, repairs can be made upon all of the elements outside of the refrigerant circuit, such as motor, switch, water valve, etc., by any ordinary mechanic with ordinary tools. Much of this work can be done without withdrawing the unit from the refrigerated space.

Where the repairs are more extensive the apparatus can be withdrawn from the refrigerated space, taken to the basement or the workshop, easily repaired, and replaced in the refrigerated space. Where special repairs are necessary on the mechanism contained within the refrigerant circuit, the entire unit can be placed in a packing box and shipped to a repair station and a substitute unit provided for that purpose can be used in the meantime without any interruption of refrigeration or any inconvenience to the occupants of the house.

This construction not only makes it possible to eliminate delay and inconvenience to the owner in making repairs, but also enables the manfacturer to install his devices over comparatively wide areas at a material reduction in the cost of service. It also enables the manufacturer to render more intelligent work on repairs because the centralization of the repair work makes it possible to employ more highly trained and experienced engineers and experts to supervise and execute the repair work.

The refrigerating unit described below is adapted to be placed anywhere it is desirable to cool the surrounding air. The unit may be employed in various relations and for cooling spaces in structures of various kinds, but for the purpose of simplicity of disclosure, the device is shown only in connection with the ordinary household refrigerator, and the description is confined thereto. Moreover, for convenience in description and illustration, the device is also shown more or less diagrammatically on the drawing.

Figure 1:
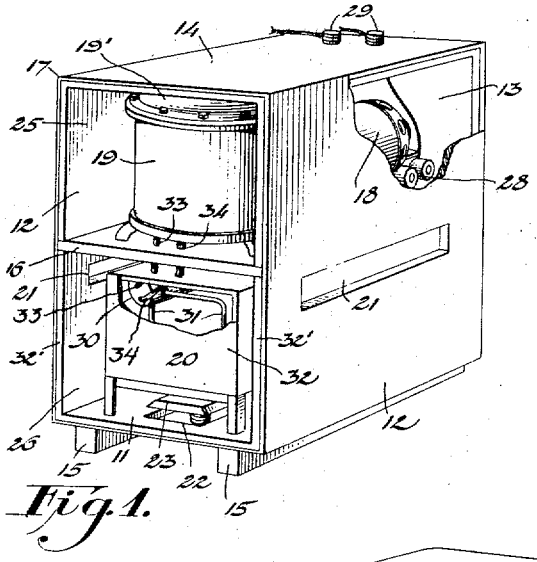
Fig. 1 is a perspective view of the cooling unit, with parts broken away and the front end of the supporting frame removed.

On the drawings, the reference numeral 1 designates a refrigerator cabinet. This cabinet may be of any form, the one shown being the usual type of household refrigerators, having the outer walls which may be provided with the usual insulating material and having the partitions 2 and 3 which divide the interior space into the ice compartment 4 and the adjacent food compartment composed of the sections 5 and 6. The food compartment may be provided with the removable shelving 7.

The vertical partition 3 has at its top and bottom the usual ventilating openings 8 and 9. The horizontal partition 2 is likewise provided with a ventilating opening 10 to permit the circulation of air from the food compartment through the ice chamber.

Figure 3:
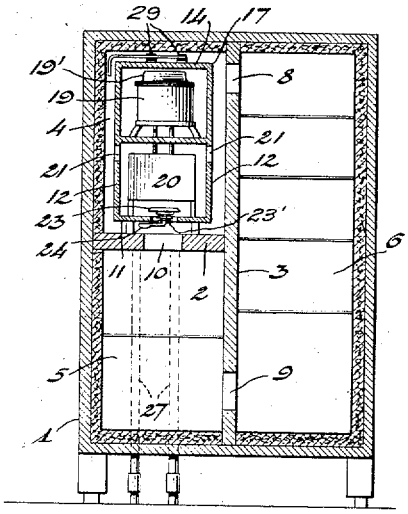
Fig. 3 is a vertical section of the device shown in Fig. 2.
Figure 2:
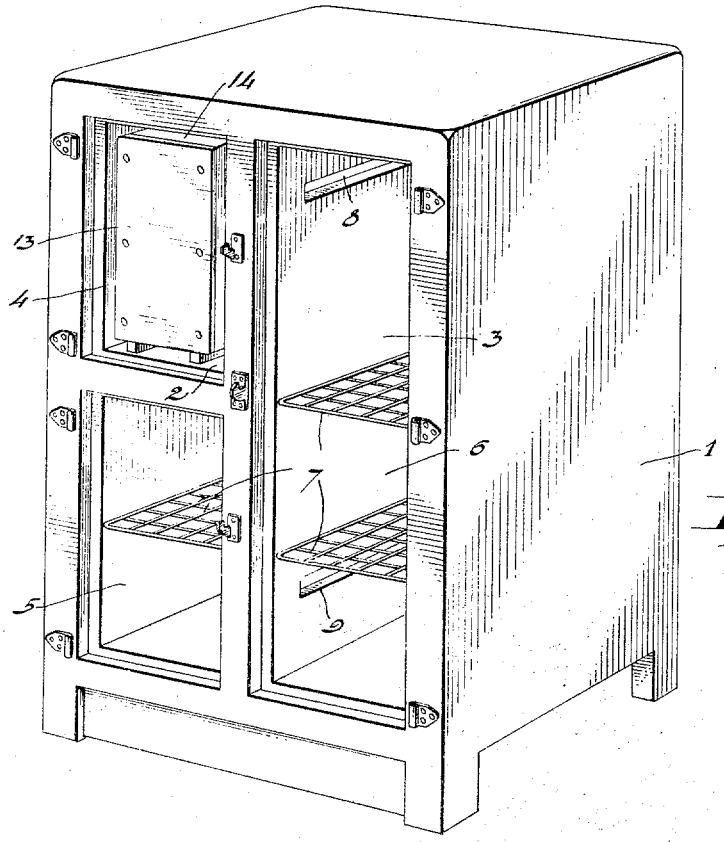
Fig. 2 is a perspective view of a refrigerator cabinet with the doors removed showing my device in place therein.

The refrigerating or cooling unit consisting of the motor 18, the compressor 19, the condenser 19′, and the vaporizer 20, may be of any well known form, such, for example, as that shown in patent to Bechtold et al., 1,276,612, August 20, 1918. It may have its parts supported in proper relation to each other by any suitable means, as the portable support or frame 17. As shown, the supporting means or frame is in the form of a housing member having the bottom wall 11, side walls 12, end walls 13 and top wall 14. These walls may, if desired, be insulated as shown at 32′. Means are provided for supporting the frame 17 in position in spaced relation to the partition 2. Any suitable means may be provided for this purpose and may be secured to any convenient portion of the frame 17. As shown, this means is in the form of supporting members 15 which are secured to the bottom wall 11 and constitute means for sliding the frame 17 into position in the refrigerator. These supporting members also maintain the frame 17 in spaced relation to the partition 2 to provide for free circulation of the air through the opening 10. The portable frame or housing 17 is provided with a horizontal partition 16 which divides the housing into upper and lower chambers 25 and 26, respectively. The upper chamber contains the refrigerant liquefying mechanism, consisting of the motor 18, the compressor 19, condenser 19′, and the usual automatic electric current and water controlling devices 28. The controls for the water and electric current may be of any known form, as, for example, like that shown in application of Bechtold et al., Ser. No. 146,715, filed February 5, 1917 (U. S. Patent 1,478,421, dated December 25, 1923). The condenser 19′, if cooled by water, may be connected to both the water main and sewer through the pipes 27 shown in dotted lines in Fig. 3. Any suitable means may be employed for operating the compressor. If the motor for operating the device be an electrical one, the electrical connection for operating the same may be made through the binding posts 29 in the usual manner.

The lower compartment contains the vaporizer 20 which may consist of the header 30 and expansion coils 31. The vaporizer may, if desired, be located in brine contained in the closed tank 32, in the usual manner. Pipes 33 and 34 connecting the compressor and condenser with the vaporizer provide for the circulation of the refrigerant in the usual manner.

The side walls 12 and bottom wall of the lower chamber have ventilating openings 21 and 22 therethrough. The opening 22 is adapted to be closed by a valve or closure 23 which is operated by any suitable thermostat or thermally operated means such as the corrugated longitudinally extensible metallic member 23′ shown more or less diagrammatically in Figs. 1 and 3 which is adapted to be extended by vapor produced by the environment temperature from a fluid contained in the bulb 24.

Since the details of the motor, the compressor, the condenser, the brine tank and vaporizer arrangement, the valve and thermostat and the various controls are no part of the present invention, the details of these devices have not been shown or described.

The thermostat 24 is so arranged that when the temperature within the food compartment falls below a predetermined point, it will close the valve to prevent air from passing therethrough. As the temperature of the air within the food compartment rises the thermostat will gradually open the valve and let more and more cold air from the lower chamber pass through the opening 22 to lower the temperature of the food compartment.

The temperature of the brine tank is controlled by a thermostat therein, not shown, which is connected to the devices 28 and controls the operation of the motor in the usual manner.

It will be noted that the openings 21 are located in the upper portion of the side walls of the lower chamber 26. This arrangement makes it possible to more accurately control the temperature of the food compartment since when the valve 23 is closed the air within the chamber surrounding the brine tank may be at a low temperature without materially affecting the temperature of the food comparment. In other words, a reservoir of cold air may be maintained within the lower chamber ready at all times, when the valve 23 begins to open, to pass into the food compartment to maintain a constant temperature therein.

When the valve 23 is open, air from the food compartment may pass through the openings 21, about the brine tank and through the openings 22 and 10 back into the food compartment. When the valve is open the air of the food compartment is free to circulate through the openings 8 and 10, thus maintaining the temperature uniform throughout the food compartment.

It will also be noted that the motor, compressor and condenser are isolated within the upper chamber. The heat generated by operation of these members does not therefore materially affect the temperature within the refrigerator. The heat generated by the operation of these devices is carried away by the condensing water in the usual way.

It will be noted that the frame 17 and refrigerant liquefying mechanism and vaporizer, when assembled constitute a portable unitary structure that may be inserted in the "ice box" of the ordinary household refrigerator and installed therein by making the proper water and electrical connections.

As has been stated above, my improved refrigerating unit is adapted to be placed in any space which it is desired to cool. This adaptability of the unit is in part due to the fact that the casing enclosing the unit insures an effective and efficient circulation of air over the vaporizer regardless of the size of the space in which the unit is installed. If no enclosing casing were provided the circulation of the air over the vaporizer would depend largely upon the size of the space around the unit and if the walls of the surrounding space were at some distance from the unit no definite and efficient circulation of the air could be relied upon. This feature of the invention is of importance not only in the cooling of room spaces of substantial volume but also in refrigerator installations, since it ensures reasonably efficient air circulation and cooling regardless of the size of the ice-box or chamber of the refrigerator.

From the foregoing description, taken in connection with the accompanying drawings, it is thought that the complete construction, operation and advantageous features of my invention will be readily understood by those skilled in the art to which the invention appertains.

What I claim is:

1. A refrigerating apparatus comprising a refrigerant compressor, a motor to drive the compressor, a condenser, a vaporizer, and a housing directly supporting the said motor compressor and condenser parts and extending around the vaporizer with air openings through the exterior walls of the housing near the top and bottom parts of the vaporizer to induce circulation of air in and out of the housing, and thermally controlled means associated with the housing opening at the bottom part of the vaporizer for controlling the passage of air therethrough, said apparatus being assembled and movable as a unit and adapted by circulation of air through said housing to cool the air of any chamber in which the unit is placed.

2. A refrigerating apparatus comprising a refrigerant compressor, a motor to drive the compressor, a condenser, a vaporizer, a housing directly supporting the said motor compressor and condenser parts and extending around the vaporizer with air openings through its exterior walls near the top and bottom parts of the vaporizer to induce circulation of air in and out of the housing, and thermally controlled means associated with the housing opening at the bottom part of the vaporizer for controlling the passage of air therethrough and responsive to the temperature of said air, said apparatus being assembled and movable as a unit and adapted by circulation of air through said housing to cool the air of any chamber in which the unit is placed.

3. In refrigerating apparatus, the combination of a portable housing assembled and movable as a unit, said housing having heat-insulating walls and upper and lower chambers and the exterior walls of said lower chamber having openings at different levels for the entrance and exit of air, refrigerant liquefying mechanism enclosed in said upper chamber, a vaporizer in said lower chamber, means connecting said mechanism and vaporizer for the circulation of the refrigerant, and thermally controlled means for controlling the flow of air through one of said openings.

4. In combination with a refrigerator cabinet, a self-supporting self-contained refrigerating apparatus comprising a casing provided with a partition dividing it into superposed compartments, one of said compartments being heat insulated, a compressor condenser means mounted in said insulated compartment, a refrigerant vaporizer mounted in the other compartment, and refrigerant conduits interconnecting said vaporizer, and said compressor condenser means, said apparatus being movable into and out of said cabinet without disturbing said conduits.

In testimony whereof, I affix my signature.

JONATHAN P. B. FISKE.